Oct. 5, 1926.　　　　　　　　　　　　　　　　　　　　1,602,272
A. KORGER
PLAITING PATTERN MAKING MACHINE
Filed August 12, 1925　　　9 Sheets-Sheet 8
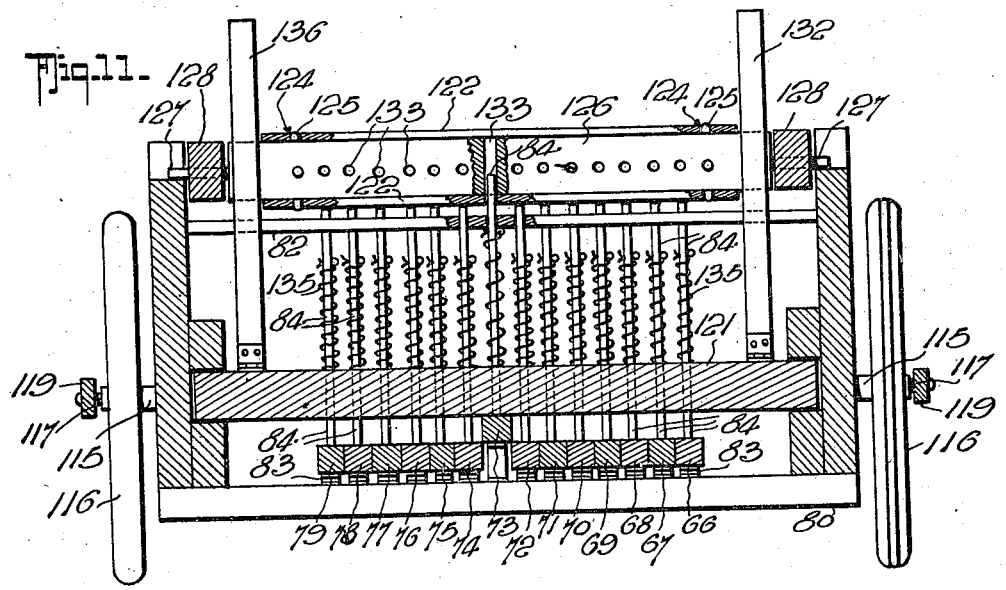
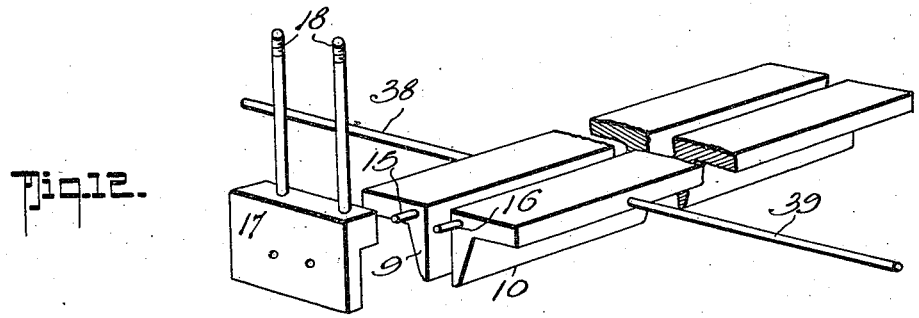
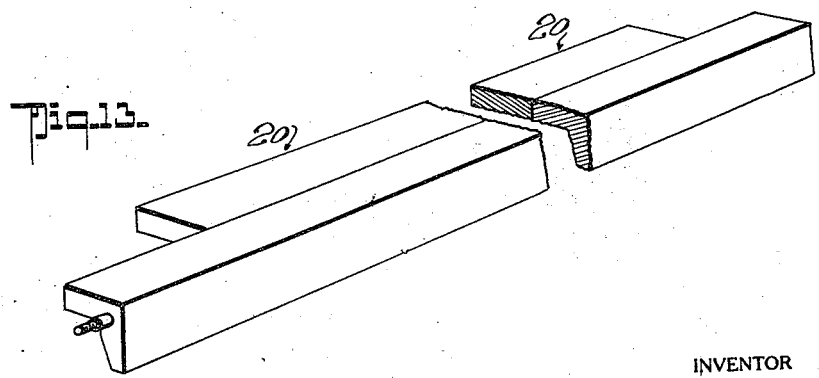
WITNESSES
INVENTOR
ANTON KORGER
BY
ATTORNEYS Oct. 5, 1926.

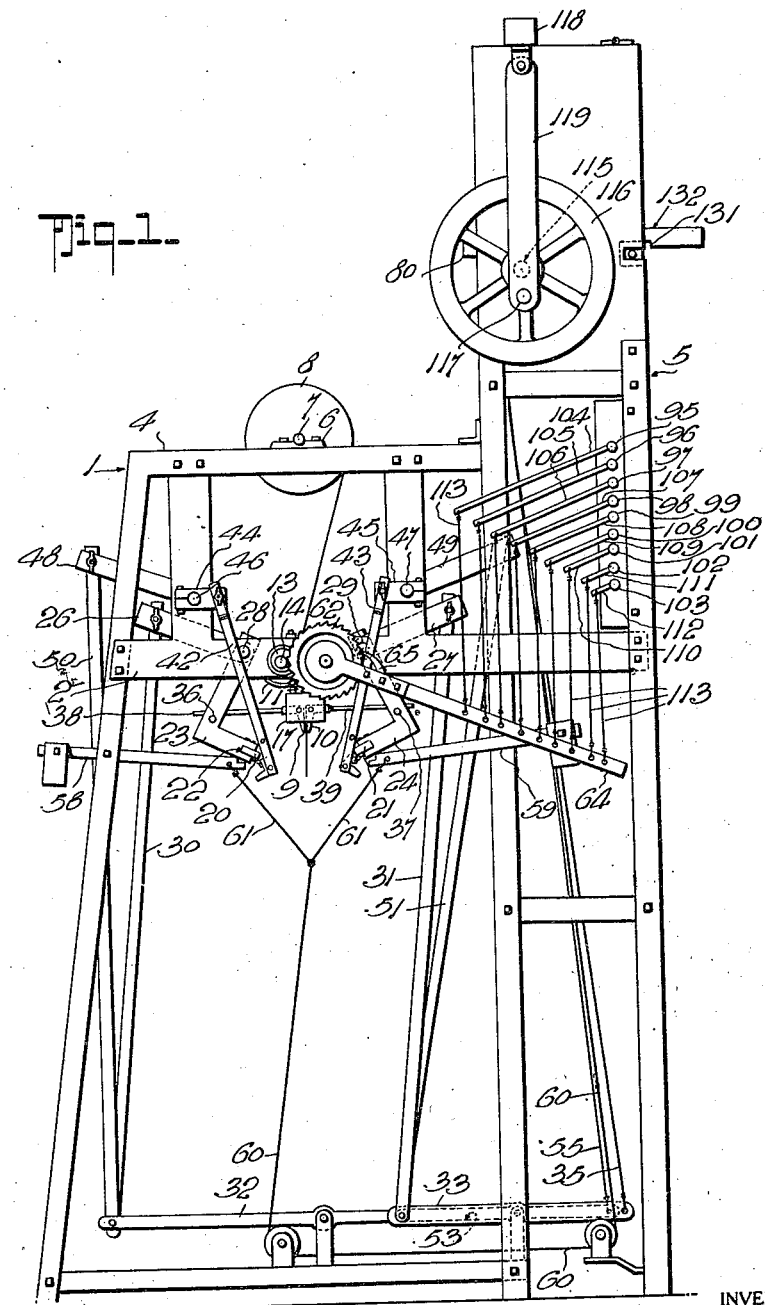

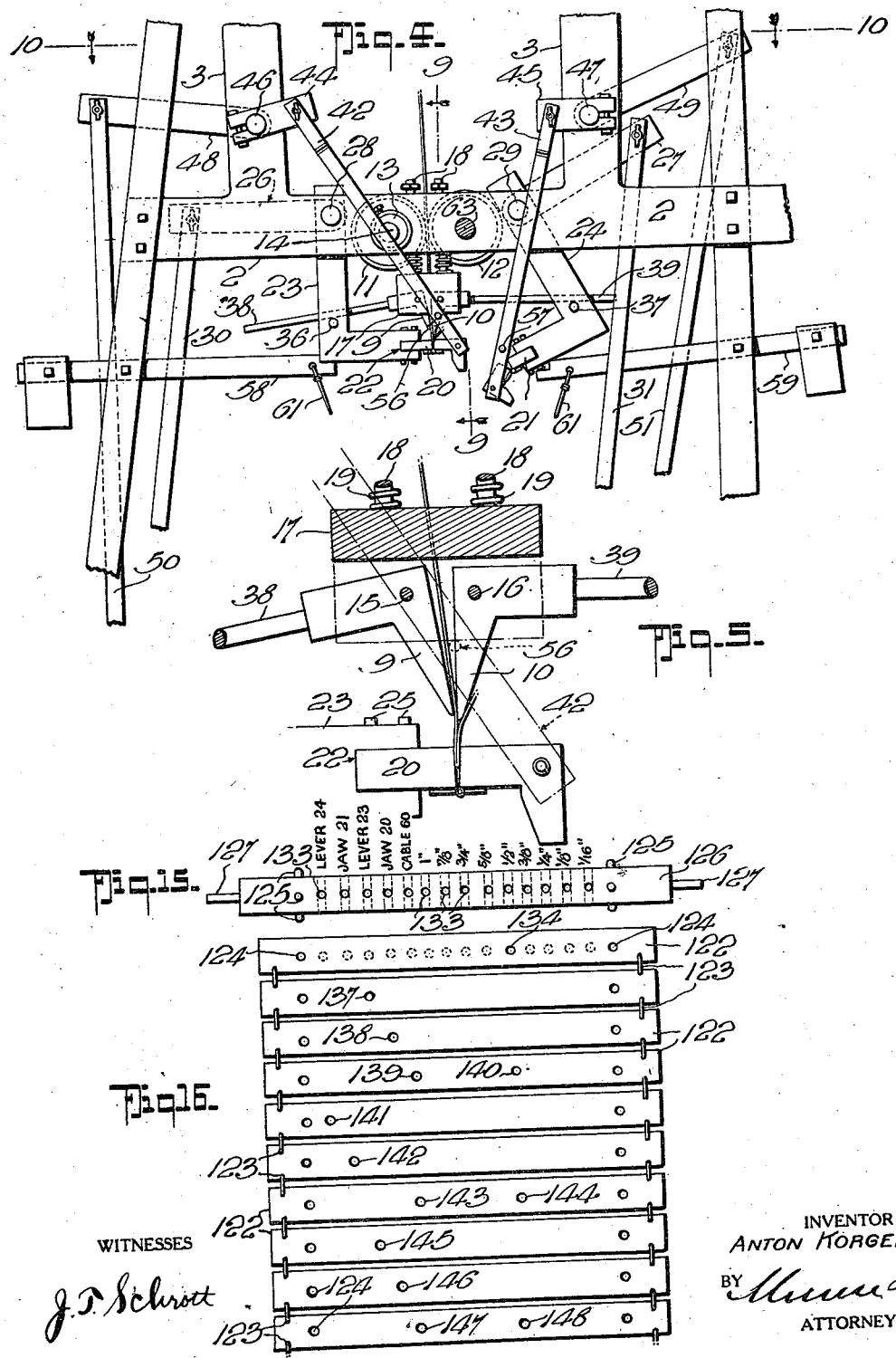

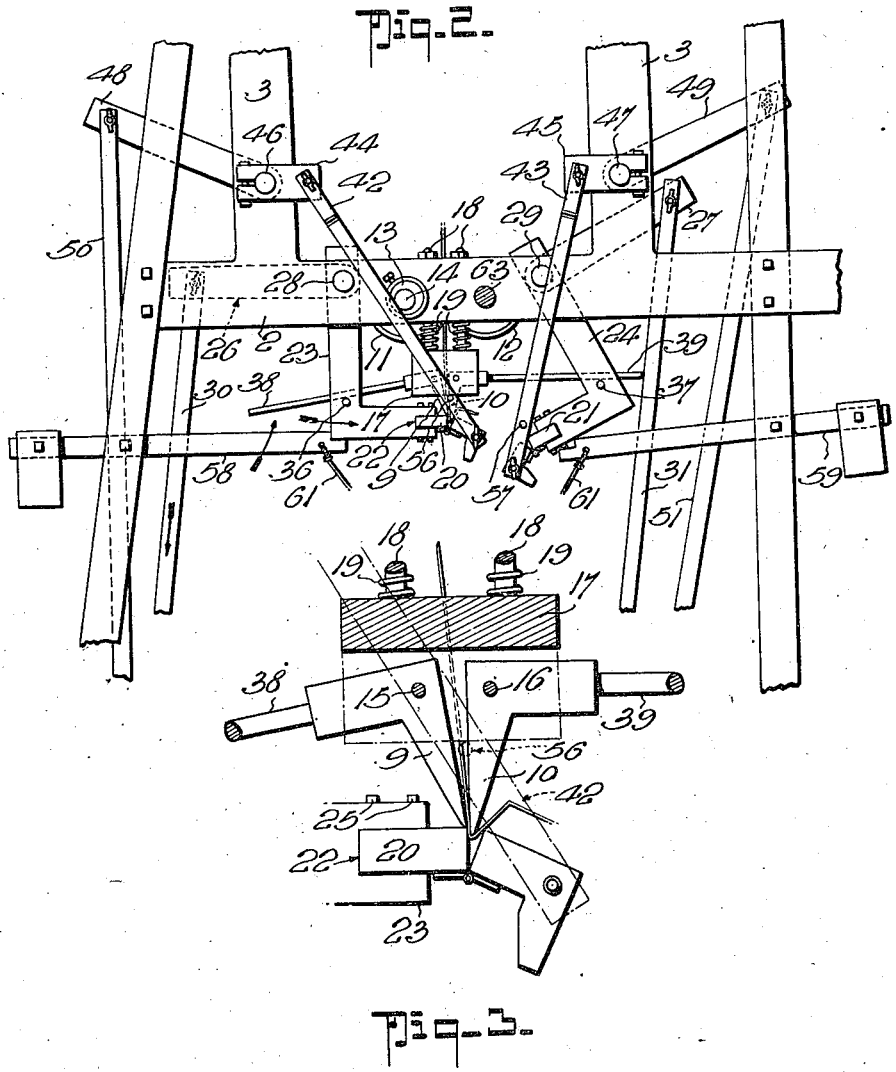

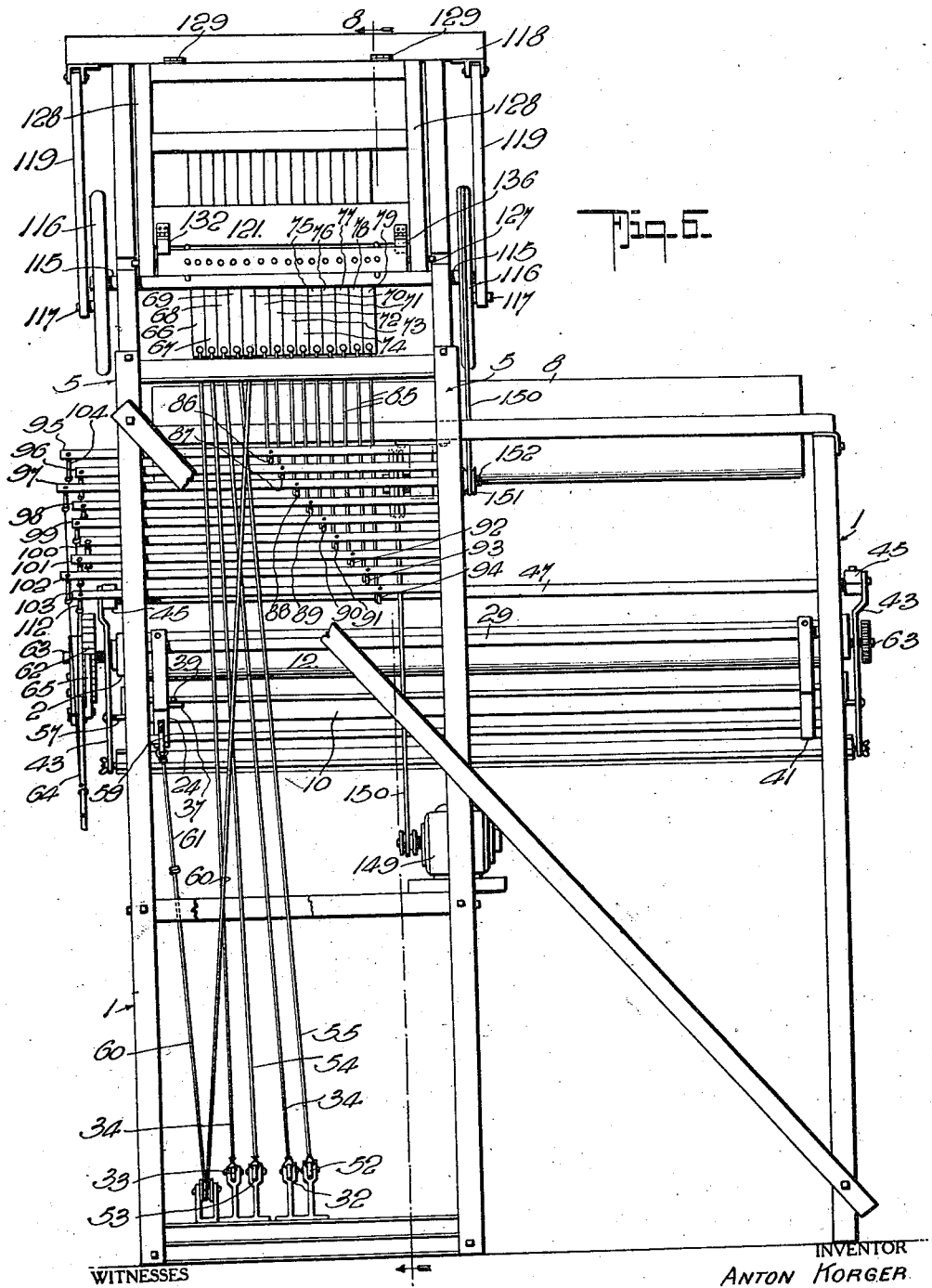

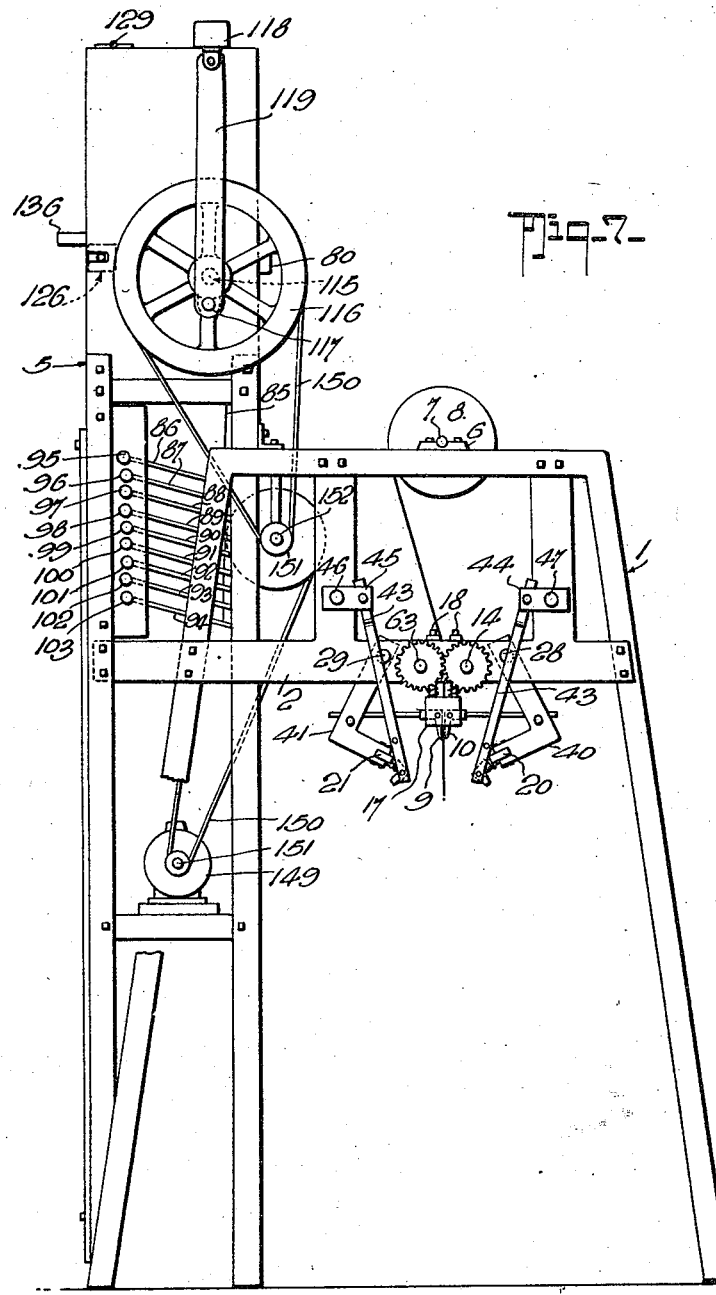

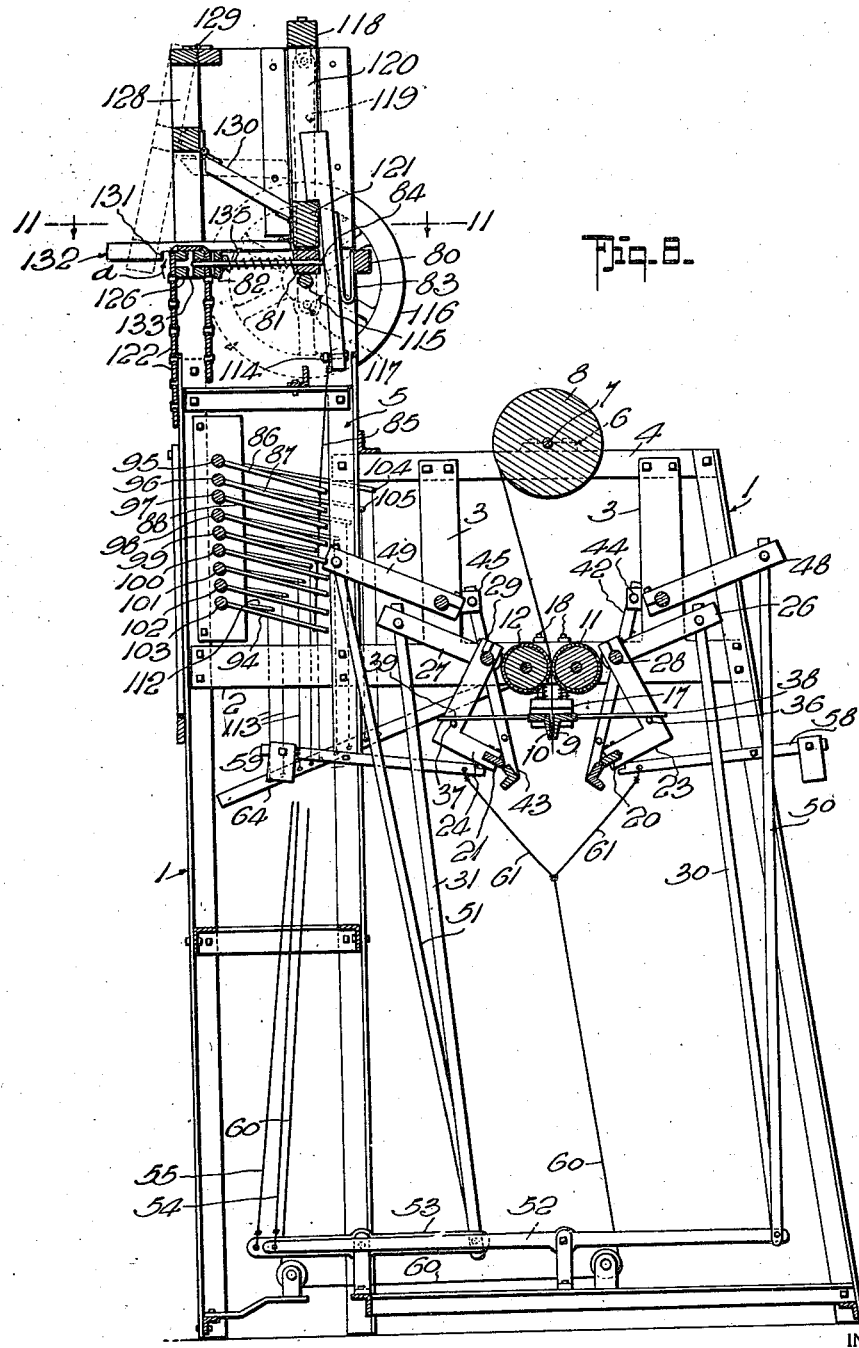

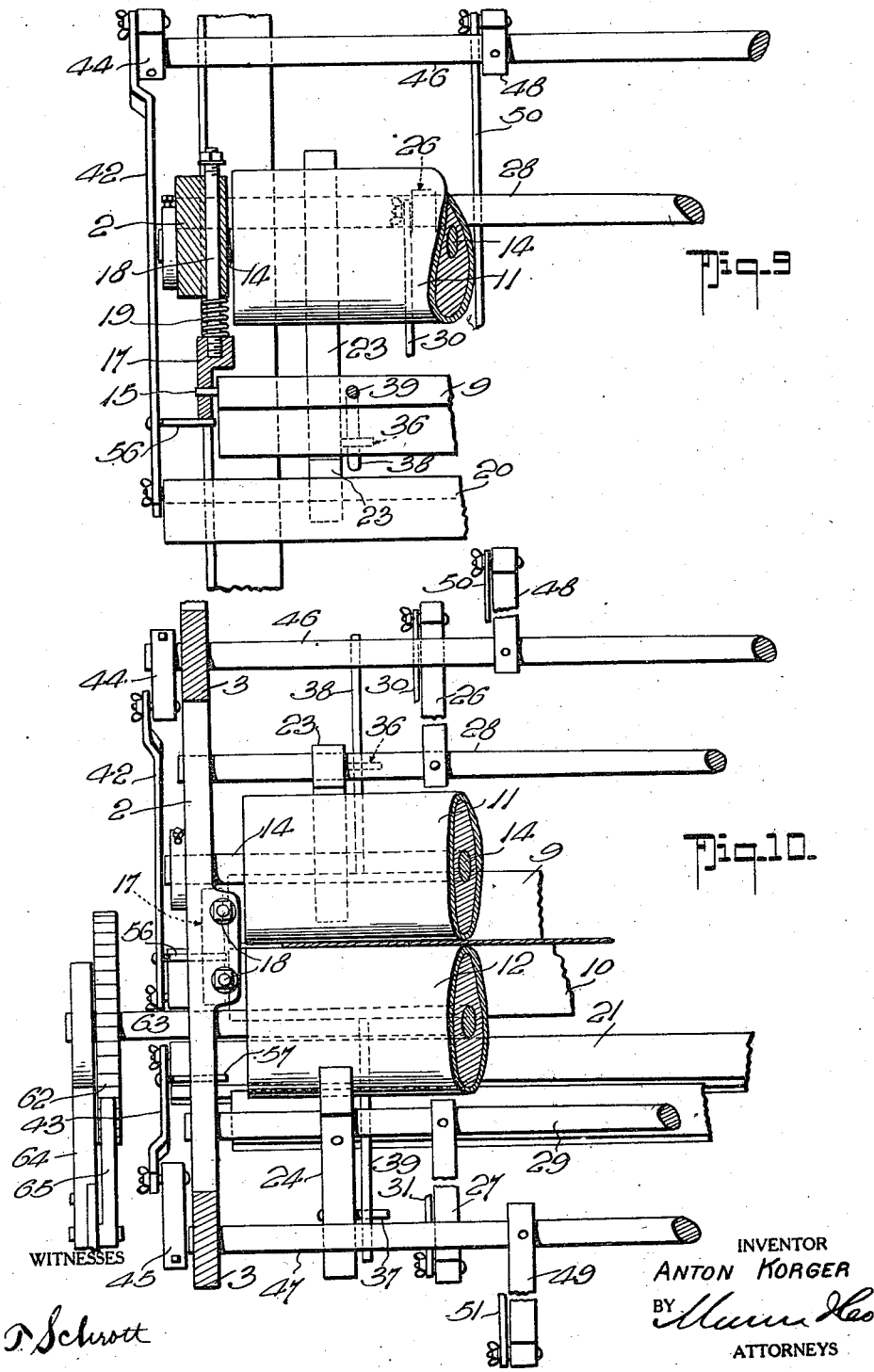

A. KORGER 1,602,272

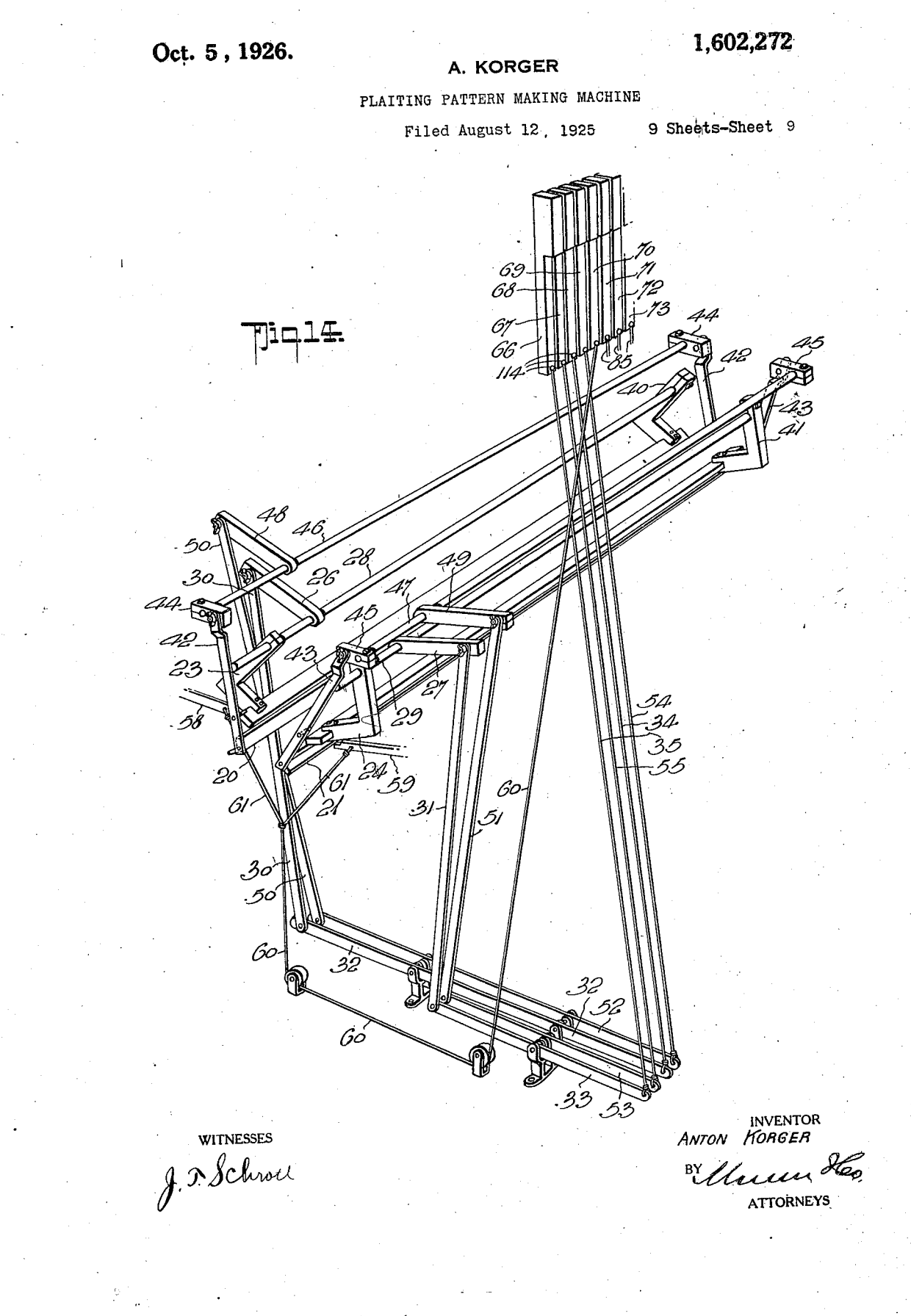

PLAITING PATTERN MAKING MACHINE

Filed August 12, 1925  9 Sheets-Sheet 9

Fig.14.

WITNESSES
J. T. Schroll

INVENTOR
ANTON KORGER
BY
ATTORNEYS

Patented Oct. 5, 1926.

1,602,272

UNITED STATES PATENT OFFICE.

ANTON KORGER, OF EAU CLAIRE, WISCONSIN.

PLAITING-PATTERN-MAKING MACHINE.

Application filed August 12, 1925. Serial No. 49,861.

This invention relates to improvements in pattern making machines and it consists of the constructions, combinations and arrangements herein described and claimed.

An object of the invention is to provide a machine for manufacturing patterns of paper or other suitable material for subsequently producing plaits in cloth when properly used for that purpose.

Another object of the invention is to provide means in a machine of the character described to form plait creases in a heavy paper or other sheet, said operation being continuous and subject to a control by which the character of the plaits can be altered so as to produce a pattern containing combinations such as box plaits, side plaits, accordion plaits, knife plaits, etc. either in succession, alternation or otherwise.

Another object of the invention is to provide a master pattern constituting the above control, which, by reason of self-functioning is regarded as automatic.

A further object of the invention is to provide a single machine which is capable of producing every known type of plaiting pattern with no other mechanical adjustment than the assembly of appropriate links in a control or master pattern.

Figure 1 is an end elevation of the improved plaiting pattern making machine.

Fig. 2 is a diagram illustrating the initial act of making a crease in the paper.

Fig. 3 is a detail diagram showing the position of the jaws and knives in the initial creasing act.

Fig. 4 is a diagram illustrating the secondary act of making a crease in the paper.

Fig. 5 is a detail diagram showing the position of the jaws and knives in the secondary creasing act.

Fig. 6 is a rear elevation.

Fig. 7 is an elevation of the machine looking from the end opposite to Fig. 1.

Fig. 8 is a central, vertical section on the line 8—8 of Fig. 6.

Fig. 9 is a detail vertical section on the line 9—9 of Fig. 4.

Fig. 10 is a detail horizontal section on the line 10—10 of Fig. 4.

Fig. 11 is a detail horizontal section on the line 11—11 of Fig. 8.

Fig. 12 is a detail perspective view of a portion of the creasing blades and an adjacent end block.

Fig. 13 is a detail perspective view of one of the creasing jaws.

Fig. 14 is a detail perspective view illustrating the creasing jaws and the arrangement of rockers by which the action of certain hooks is imparted to the various jaws and levers.

Fig. 15 is a detail elevation of the pattern block for advancing the master pattern, the purposes of the various holes being designated by legend.

Fig. 16 is an elevation of a part of the rearward portion of the master pattern.

As briefly stated in the foregoing objects of the invention the purpose of the improved machine is to manufacture patterns to be later used in plaiting cloth such as dress goods and the like. The material from which the pattern is made ordinarily consists of a heavy variety possessing qualities that withstand considerable handling, steaming, etc. The machine structure comes under two general subjects; the mechanism for creasing the pattern and the control device.

The mechanism for creasing the pattern comprises a framework generally designated 1 which is composed of parallel horizontal bars 2, a pair of uprights 3 and top rails 4. A relatively tall frame 5 completes the general framework and inasmuch as it carries the control device it may be distinguished as the control frame. Brackets 6 on the top rails 4 support the arbor 7 of the roll 8 by which pattern paper is supplied to the blades or knives 9 and 10 between rubber-faced rollers 11 and 12. Adjustable eccentric bushings 13 for the shaft 14 of the roller 11 permit regulation of the space between the rollers.

The knives 9 and 10 are pivoted at 15 and 16 to a pair of end blocks 17 which are suspended by pairs of bolts 18, or equivalent means, from the horizontal bars 2. The suspension arrangement preferably is of limited flexibility, stout springs 19 coiled about the bolts between the end blocks and horizontal bars permitting slight yielding when the jaws 20 and 21 come into action to crease the paper.

Recesses 22 in the lower extremities of pairs of levers 23, 40 and 24, 41 carry the creasing jaws, one or more screws 25 holding them in place. The jaw levers, together with operating arms 26 and 27, are appropriately fixed upon shafts 28 and 29 which are journalled in the horizontal bars 2. A pull upon either link 30 or 31 will rock the corresponding pair of levers so that either jaw 20 or 21 closes in upon the knives (Figs. 2 and 3) preparatory to making the crease. The pull is supplied by the control device to rockers 32 and 33 through cables 34 and 35 or the pull may be transmitted by cables directly to the operating arms.

Pins 36 and 37 on back of the jaw levers 23 and 24 normally support the knives 9 and 10 in the open condition (Fig. 1) by engagement with stems 38 and 39 extending from the knives in diverse directions. Upon rocking of the lever pair 23, 40 (for example) the pin 36 moves downward. The stem 38 follows, and the weight of the knife 9 bears against the knife 10.

Pairs of the levers are necessary to uniformly support the creasing jaws 20 and 21 at opposite ends. Closing of the creasing jaws is accomplished by pairs of closing links 42 and 43 which are independently operated by pairs of cranks 44 and 45 on opposite ends of shafts 46 and 47, journalled in the uprights 3. Operating arms 48 and 49 turn the crank shafts when links 50 and 51 are pulled upon moving the rockers 52 and 53 through cables 54 and 55 from the control device. Only one is operated at a time in any instance. The pull on the operating arms may be applied by cables directly from the control device.

The aforesaid yielding of the end blocks 17 occurs when lift pins 56 or 57 on the closing links 42 or 43 (depending on the side in operation) engage beneath the block 17 in Figure 1. This engagement lifts the knives out of the crease (Figs. 2 and 3), leaving the paper between the jaws 20 or 21. Approximately at this time either wedge arm 58 or 59 engages the corner of the operated jaw lever (23, for example, Fig. 4) and the continuing upward motion of the link 42 clamps the jaw 20 tightly upon the paper, pressing it into a sharp crease.

A cable 60, actuated by the control device and having common connection at 61 with the wedge arms, then pulls down on the wedge arms, letting the jaw lever 23 fall back. The knives also return to the normal open position, and the foregoing operation is repeated on the right side.

But before the repeated operation occurs, the control device causes feeding of a half inch (more or less) of paper to the knives by means of the ratchet 62 on one end of the shaft 63. The pawl lever or arm 64 swings freely upon the shaft and carries a pawl 65 which engages the ratchet. The action of the lever, consequently the pawl is differential, causing a greater or less turn of the rollers and a corresponding feeding of paper according to selective rocking means described later.

The jaw levers 23 and 24 act alternately until the number of creases involved in the desired pattern and necessary to produce a full length pattern have been made. The fact that the pattern hangs down and is moved from side to side as the subsequent creases are made does not result in damage to the pattern. As soon as a crease is made, the pattern is necessarily stretched flat again. This in no way harms the pattern, as when it is in use, it must be so stretched out each time it is used. The quantity of paper fed, or the interval between creases, is variable at will through the functions of the jacquard control device or mechanism, and thereby may be made accordion, box plaiting, box fluting plaiting patterns and combinations thereof as may be desired.

The control device comprises a series of fourteen hooks 66, 67, 68, 69, 70, 71, 72, 73, 74, 75, 76, 77, 78 and 79 (Figs. 6, 8 and 11) which are guided between a retaining bar 80 at the front and one of a pair of plunger guides 81 and 82. Springs 83 (Fig. 8) tend to normally keep the hooks in contact with the ends of plungers 84 supported in the guides. The hook 66 Fig. 14 controls jaw lever 24 through cable 35, rocker 33 and link 31; hook 67 controls jaw 21 through cable 55, rocker 53 and link 51; hook 68 controls jaw lever 23 through cable 34, rocker 32 and link 30, while hook 69 controls jaw 20 through cable 54, rocker 52 and link 50. Hook 70 controls wedge arms 58 and 59 through cable 60.

The remaining nine hooks 71 to 79 have connection through cables 85 (Fig. 6) with forwardly extending pins 86, 87, 88, 89, 90, 91, 92, 93 and 94 (Figs. 7 and 8) of ratchet shafts 95, 96, 97, 98, 99, 100, 101, 102 and 103. These shafts are journalled in the control frame 5, and those ends protruding at the end of the framework (Fig. 6) are staggered in sets of three. These staggered ends carry lift rods 104, 105, 106, 107, 108, 109, 110, 111 and 112 (Fig. 1) which become progressively shorter but carry independent connections 113 having attachment to the pawl lever 64.

A turn of any of the ratchet shafts 95, 96, etc., through an equal angular distance by means of the various hooks 71, 72, etc., will produce a progressively smaller throw of the pawl lever 64 so that paper is fed by the rollers 11 and 12 to produce $1''$, $7/8''$, $3/4''$, $5/8''$, $1/2''$, $3/8''$, $1/4''$, $1/8''$ and $1/16''$ intervals between creases, this being the means by which selective rocking of the pawl lever or arm 64 is had. A turn of shaft 95 will cause the greatest throw of the pawl lever 64 because the lift rod 104 is longest, and an equal turn of shaft 103 will cause the least throw of the pawl lever because the lift rod 112 is shortest.

The mode of attachment at 114 of the various cables mentioned with the various hooks may be by means of pins or the like. A shaft 115 journalled upon the control frame carries a wheel 116 at each end. Coaxial crank pins 117 on these wheels have connection with a crosshead 118 through rods 119. The crosshead carries combined suspension and guide rods 120 by which the cross head 118 and a hook lift bar 121 are compelled to travel a vertical, rectilinear path. When permitted, the bar 121 will upon upward movement lift as many hooks of the series 66 to 79 as may have pressed rearwardly.

A master pattern or jacquard mechanism (Fig. 16) controls the foregoing action of the hooks. This pattern is composed of an endless chain of links or plates 122 of heavy cardboard or other suitable material loosely connected by heavy twine or flexible wire 123. Each link 122 has end holes 124 which are engaged by studs 125 on a cross-sectionally square pattern block 126 in order to advance the master pattern a step at a time.

The pattern block is supported on end trunnions 127 in hangers 128 and turns over one quarter each time the hook lift bar is elevated. The hangers are hinged 129. They are connected with the lift bar 121 by hinged struts 130. The elevation of the lift bar moves the hangers and pattern block to the dotted line position in Fig. 8. Simultaneously with this movement the heel 131 of a pawl 132 turns the block forward a quarter turn (arrow $a$), moving the master pattern an equal amount and bringing the next link 122 in place over the front of the block.

The front of the pattern block comes next to the guide 82 (Fig. 8). The pattern block has holes 133 bored at right angles. The ends of the plungers 84 will project by means of a spring 135 into a hole 133 when a perforation 134 (for example) registers with such hole. This projection of the plunger permits rearward movement of the corresponding hook so that it catches upon the lift bar 121 preparatory to being raised.

Upon swinging outward (dotted lines Fig. 8) the projected plunger will be deserted. The next pattern link moves into position over the front of the block 126, probably covering the formerly exposed hole 133 and exposing some other at another registering aperture. The result is that upon return of the pattern block the plunger 84 (Fig. 8) and corresponding hook are returned and some other plunger and hook are projected. A check pawl 136 (Fig. 7) prevents the block 126 from turning more than a quarter turn at a time.

Refer to Fig. 16. This is an elevation of a part of the rearward portion of the master pattern in Fig. 8, i. e. that part of the pattern loop that may be regarded as at the left of the pattern block 126 and movable forward to the right and down. The dotted circles along the uppermost pattern link 122 are to show the positions of the plungers 84. The perforation 134 (mentioned before) actuates hook 75 because the corresponding plunger would be permitted to project through. The hook 75 turns ratchet shaft 99 (Figs. 1 and 8) which through rod 108 and connection 113, actuates the pawl lever 64 sufficiently to advance the paper ½".

Reading down from the top (Fig. 16) the arrangement and purpose of the perforations is as follows: 1st link, perforation 134 controls hook 75 which causes feeding of ½" of paper; 2nd link, perforation 137 controls hook 68 which actuates jaw lever 23; 3rd link, perforation 138 controls hook 69 which actuates jaw 20; 4th link, perforations 139 and 140 control hooks 70 and 75 which actuate the cable 60 and cause feeding of another ½" of paper; 5th link, perforation 141 controls hook 66 which actuates jaw lever 24, it being remembered that the jaw levers alternate in operation; 6th link, perforation 142 controls hook 67 which actuates jaw 21.

The 7th link has perforations 143 and 144 which, being in line with perforations 139 and 140 have similar control of hooks 70 and 75. It is noticed that the 4th and 7th links have double perforations, it being possible to actuate the cable 60 and feed paper at substantially the same time. But the various links may be confined to single perforations as shown for illustration in the case of the 1st link. Here the perforation 134 controls the paper-feeding hook 75 only the equivalent of perforations 139 and 143 being omitted.

Links 8th, 9th and 10th have perforations 145, 146, 147—148 which control hooks 68, 69, 70 and 75 for functions described. It must be obvious to the reader that the manner of operation of the machine depends directly upon the distribution of perforations in the pattern links. For example, placing the perforation 134 (Fig. 16) two positions to the right of its present position would cause control of hook 77 and result in ¼" intervals between creases.

The operation may be briefly reviewed to advantage. Power is derived from an electric or other motor 149 (Fig. 7) of appropriate horsepower for the turning of shaft 115 through suitable belts 150, pulleys 151 and countershaft 152 (Fig. 7). The shaft 115 revolves continuously while the machine is in operation causing corresponding rectilinear rising and falling of the crosshead 118 (Figs. 6, 7, and 8) and lift bar 121 (Fig. 8).

The solid portion of a pattern chain link 122 between the pattern block 126 and guide 82 (Fig. 8) will hold the plungers 84 forward and keep the hooks 66, 67, etc. out of reach of the lift bar 121. But each link has a perforation, and the adjacent plunger will project into that perforation. Take the perforation 134 (Fig. 16). Upon projection of the corresponding plunger 84 the hook 75 moves rearward to be lifted by the bar 121. The resulting pull on the attached cable 85 (Fig. 6) will turn shaft 99 (Fig. 1) and lift lever 64 a distance equal to the feeding of ½" of paper between rolls 11 and 12.

Accompanying the act of raising the hook 75 the lift bar 121 swings the pattern block 126 rearward (dotted lines Fig. 8), disengaging the plunger 84 and causing the pawl heel 131 to turn the block one quarter to place the second link 122 (Fig. 16) in position in front of the pattern block. The perforation 137 will next permit projection of a plunger 84 so that the hook 68 is caught by the lift bar.

The resulting pull upon cable 34 (Figs. 6 and 14) will tilt the rocker 32 and through link 30 move the jaw lever 23 into the initial creasing position (Fig. 2). The next action of the pattern chain causes hook 69 to pull up on cable 54 to tilt the rocker 52 and through link 50 clamp the jaw 20 upon the paper (Figs. 4 and 5) to press the crease. The accompanying act of the closing link 42 Fig. 4) lifts the creasing knives 9 and 10 out of the crease so that all of the pressure can be exerted upon the paper.

While the construction and arrangement of the plaiting pattern making machine is that of a generally preferred form, obviously modifications and changes may be made without departing from the spirit of the invention or scope of the claims.

I claim:

1. Apparatus for plaiting paper comprising a pair of blades between which is fed material for a plaiting pattern, a jaw for pressing a crease in the paper, means including a lever carrying the jaw and which is swingable to dispose the jaw over the blades and paper, means which then pulls upon the jaw to form the crease, and means which acts substantially in consonance with said pull to withdraw the blades sufficiently to insure freedom of the creasing operation.

2. Apparatus of the character described comprising a pair of blades between which pattern paper is fed, means including end blocks by which the blades are carried, a creasing jaw, a swingable lever moving the jaw in clamping position over the blades and paper, means to close the jaw and press the crease, and means which lifts the end blocks to disengage the blades.

3. Apparatus of the character described comprising a pair of blades between which pattern paper is fed, means by which the blades are yieldably suspended, an open creasing jaw, a swingable lever carrying and moving the jaw over the blades and protruding paper, means to pull upon the jaw to close it upon the paper in the creasing operation, and means moving with said pulling means causing said suspension to yield and retract the blades from interference with the crease.

4. Apparatus of the character described comprising blades between which pattern paper is fed, means including end blocks and bolts by which the blades are supported, an open creasing jaw, a swingable lever carrying and moving the jaw over the blades and protruding paper, means to pull upon the jaw to close it, a pin carried by said pulling means engaging said end blocks to raise the blades, and resilient means including springs upon the bolts yielding upon being compressed to permit raising of the blocks.

5. Apparatus of the character described comprising blades between which pattern paper is fed, creasing jaws, levers by which the jaws are moved into position over the blades, means including a pin on each lever and stem on each blade supporting the blades in normally spaced positons, and means rocking first one lever then the other to move the jaws into creasing position over the blades and alternately removing said support to permit the corresponding blade to lean against the other.

6. Apparatus of the character described comprising blades between which pattern paper is fed, a creasing jaw, a lever carrying the jaw and moving it into creasing position over the blades, and a wedge arm then coming into position behind the lever to hold it in said position.

7. Apparatus of the character described comprising blades between which pattern paper is fed, a hinged creasing jaw, a pivoted lever carrying the jaw, a pivoted and weighted wedge arm, means to rock the lever upon its pivot and move the jaw into creasing position over the blades whereupon the wedge arm assumes a holding position behind the lever, and means to then pull upon the hinged jaw to make the crease.

8. Apparatus for plaiting paper comprising blades, rollers by which the paper is fed to the blades, a ratchet on the shaft of one of the rollers, an arm having a pawl to actuate the ratchet, and selective means to rock the pawl arm through any one of a plurality of different angular distances.

9. Apparatus for plaiting paper comprising blades, rollers by which the paper is fed to the blades, a pawl and ratchet for actuating one of the rollers, an arm to actuate the pawl, and a plurality of connections attached to the arm at various radial positions rocking the arm through any one of a plurality of different angular positions.

10. Apparatus for plaiting paper comprising blades, rollers by which the paper is fed to the blades, a pawl and ratchet for actuating one of the rollers, an arm to actuate the pawl, a plurality of uniformly turnable shafts, rods on said shafts disposed over the pawl arm becoming progressively shorter as the extremity of the arm is approached, and connections between the arm and rods by which turns of uniform angular distance of the shafts result in throws of the pawl arm of varied angular distances.

11. Apparatus of the character described comprising paper feed rollers, mechanism to actuate the rollers including a pawl arm, a plurality of shafts, means to impart a turn of equal angular distance to each, and means by which said uniform turns are converted into movements of the pawl arm of varied angular distance.

12. Apparatus of the character described comprising paper feed rollers, mechanism to actuate the rollers including a pawl arm, a plurality of shafts, an equal plurality of elements to each of which is given an equal throw to impart a turn of equal angular distance to the respective shaft, and connections between the shafts and pawl arm so arranged that said equal turns are converted into movements of the pawl arm of varied angular distance.

13. Apparatus of the character described comprising paper feed rollers, mechanism to actuate the rollers including a pawl arm, a plurality of shafts, an equal plurality of elements to each of which is given an equal throw to impart a turn of equal angular distance to the respective shaft, means including lift rods carried by said shafts disposed over the pawl arm and becoming progressively shorter as the extremity of the arm is approached thereby producing progressively diminishing throws of the pawl arm, and connections between said arm and lift rods.

14. Apparatus of the character described comprising paper feed actuating means including a pawl arm, a plurality of shafts, a uniformly reciprocable lift bar, a plurality of hooks in connection with said shafts being under such control that they may engage said bar and be lifted to turn the respective shafts a uniform angular distance, and means associated with said shafts and pawl arm to convert said turns into variable angular throws of the pawl arm.

15. Apparatus of the character described comprising paper feed actuating means including a pawl arm, a uniformly reciprocable lift bar, a plurality of shafts, a plurality of hooks connected therewith, a plurality of plungers at one end engaging the hooks, a pattern engaged by the plungers at the other end, said pattern comprising links having openings to admit the plungers and permit the coacting hooks to engage the lift bar, and means to convert the resulting uniform turns of the shafts into variable angular throws of the pawl arm.

16. Apparatus of the character described comprising paper feed actuating means including a pawl arm, a control therefor comprising a uniformly reciprocable lift bar, a hook having means including a spring urging it toward the bar, a periodically movable master pattern composed of variably perforated links, a plunger disposed between the pattern and hook keeping the hook disengaged until a prearranged perforation arrives, and means to impart the resulting lift of the hook to the pawl arm.

17. Apparatus of the character described comprising paper feed control means including a pawl arm, a master pattern composed of perforated links, a block to which the pattern is applied, plungers in position to enter the perforations, a uniformly reciprocable lift block, hooks held by said plungers from engagement with said lift block until a prearranged perforation arrives, means actuated by the then lifted hook to operate the pawl arm, and means also actuated by the lift block to turn the pattern block and present another pattern link.

18. Apparatus of the character described comprising paper feed control means including a pawl arm, a master pattern composed of perforated links, a block to which the pattern is applied, plungers in position to enter the perforations, a uniformly reciprocable lift block, hooks held by said plungers from engagement with said lift block until a prearranged perforation arrives, means actuated by the then lifted hook to operate the pawl arm, and means also actuated by the lift block to turn the pattern block and present another pattern link, said means including a hanger by which the pattern block is carried, means to swing the hanger out as the lift block raises, and means including a pawl then engaging the pattern block so as to turn it.

19. Apparatus of the character described comprising a revoluble pattern block having series of communicating holes entering the various faces, a master pattern resting upon said block being composed of apertured links, a uniformly reciprocable lift bar, hooks to be lifted thereby, and plungers normally holding the hooks away until they enter prearranged registering apertures and holes.

20. Apparatus of the character described comprising a revoluble pattern block having series of communicating holes entering the various faces, a master pattern resting upon said block being composed of perforated links, a uniformly reciprocable lift bar, hooks to be lifted thereby, plungers normally holding the hooks away until they enter prearranged registering apertures and holes, means including hangers carrying the pattern block, means including struts connected betweeen the hangers and lift block swinging the pattern block outward to dislodge the entered plunger, and means to simultaneously revolve the pattern and bring another link into position for the registration of another hole and aperture.

21. Apparatus of the character described comprising pattern paper feed rollers, a jaw for creasing the paper, a lever for moving the jaw into creasing position, means to finally press the crease, means for operating the foregoing means and a jacquard mechanism for controlling said last-named means in appropriate order and repeating them until a requisite number of creases are produced.

22. Apparatus for plaiting paper comprising a pair of blades between which is fed material for a plaiting pattern, a jaw for pressing a crease in the paper, means including a lever carrying the jaw and which is swingable to dispose the jaw over the blades and paper, and means which then pulls upon the jaw to form the crease.

ANTON KORGER.